(12) United States Patent
Boischio

(10) Patent No.: US 7,046,495 B2
(45) Date of Patent: May 16, 2006

(54) DEVICE FOR CONNECTING AND INSULATING A THERMAL PROTECTOR AND/OR A FUSE FOR ELECTRICAL WINDINGS OF MOTORS

(75) Inventor: Ido Boischio, Padua (IT)

(73) Assignee: Inarca S.p.A., Vigodarzere (IT)

( * ) Notice: Subject to any disclaimer, the term of this patent is extended or adjusted under 35 U.S.C. 154(b) by 483 days.

(21) Appl. No.: 10/387,449

(22) Filed: Mar. 14, 2003

(65) Prior Publication Data

US 2003/0193768 A1    Oct. 16, 2003

(30) Foreign Application Priority Data

Apr. 15, 2002  (IT)  ............... PD2002A0094

(51) Int. Cl.
*H02H 5/00* (2006.01)
(52) U.S. Cl. ........................ 361/104; 361/23
(58) Field of Classification Search ............... 361/104, 361/23
See application file for complete search history.

(56) References Cited

U.S. PATENT DOCUMENTS 4,132,913 A * 1/1979 Lautner et al. ........... 310/68 C 6,326,879 B1    12/2001  Krogmeier et al.

FOREIGN PATENT DOCUMENTS

EP    0 431 238    6/1991
EP    1 162 714    12/2001

OTHER PUBLICATIONS

Patent Abstracts of Japan vol. 013, No. 359 (E-804), Aug. 10, 1989 & JP 01 117638 A (Mitsubishi Electric Corp), May 10, 1989 *abstract; figures 1,2*.

* cited by examiner

*Primary Examiner*—Stephen W. Jackson

(74) *Attorney, Agent, or Firm*—Modiano & Associati; Albert Josif; Daniel O'Byrne

(57) ABSTRACT

A device for connecting and insulating a thermal protector for electrical windings of motors, comprising a tray-like shell made of plastics, which contains the protector and/or the fuse, which have one or more electrical contact terminals that protrude from the shell, the shell being complementary with respect to a spool of the winding of a motor, whose structure it completes, the shell having one or more male/female interlocking components that are complementary to corresponding male/female interlocking components of the spool.

10 Claims, 4 Drawing Sheets

DEVICE FOR CONNECTING AND INSULATING A THERMAL PROTECTOR AND/OR A FUSE FOR ELECTRICAL WINDINGS OF MOTORS

BACKGROUND OF THE INVENTION

The present invention relates to a device for connecting and insulating a thermal protector and/or a fuse for electrical windings of motors.

As is known, in the mass-production of electric motors manufacturers increasingly feel the need to automate processes in order to achieve considerable economies of scale.

However, this requirement clashes with the fact that in the electrical sector many technologically advanced countries have rather restrictive statutory provisions to ensure the quality and safety of the product.

Accordingly, the need to combine high quality and safety with large production runs induces operators in the field to develop solutions orientated toward assembling the components on automatic machines.

In particular, one very important component of the protection means of an electric motor is the so-called thermal protector and in particular its connection and insulation.

The thermal protector substantially consists of a component that is sensitive to the temperature variations of the windings of the motor and ensures that such windings, upon reaching a preset temperature, are disconnected from the contacts with the electric power supply.

The thermal protectors currently applied to motors are substantially connected by means of wires that are clinched or welded and then insulated with heat-shrinking sheaths and are positioned manually, and therefore it is necessary to provide a specialized operator dedicated to the wiring and assembly thereof.

In some cases it is necessary to apply and connect a fuse, alone or in combination with the thermal protector.

SUMMARY OF THE INVENTION

The aim of the present invention is to provide a device for connecting and insulating a thermal protector and/or a fuse for electrical windings of motors that is substantially standardized for a plurality of motors and ensures automated assembly without however renouncing the assurances of safety and quality of the final product.

Within this aim, an object of the present invention is to provide a device for connecting and insulating a thermal protector and/or a fuse that allows to eliminate welded connections.

Another object of the invention is to provide a device for connecting and insulating a thermal protector and/or a fuse that ensures total lack of significant interference regarding the properties of detection and sensitivity to temperature variations of the winding.

Another object of the present invention is to provide a device for connecting and insulating a thermal protector and/or a fuse whose structure ensures high flexibility in application both in terms of shape and in terms of dimensions.

Another object of the present invention is to provide a device for connecting and insulating a thermal protector and/or a fuse whose structure allows application also to types of motor that are already in production and have been developed.

Another object of the present invention is to provide a device for connecting and insulating a thermal protector and/or a fuse whose structure allows to manufacture it with known technologies and equipment.

This aim and these and other objects that will become better apparent hereinafter are achieved by a device for connecting and insulating a thermal protector and/or a fuse for electrical windings of motors, characterized in that it comprises a tray-like shell made of plastics, which contains the protector and/or the fuse, which have one or more electrical contact terminals that protrude from such shell, the shell being complementary with respect to a spool of the winding of a motor, whose structure it completes, the shell having one or more male/female interlocking components that are complementary to corresponding male/female interlocking components of said spool.

BRIEF DESCRIPTION OF THE DRAWINGS

Further characteristics and advantages of the invention will become better apparent from the following detailed description of an embodiment thereof and of various application situations, illustrated only by way of non-limitative example in the accompanying drawings, wherein.

DESCRIPTION OF THE PREFERRED EMBODIMENTS

Figure 1:
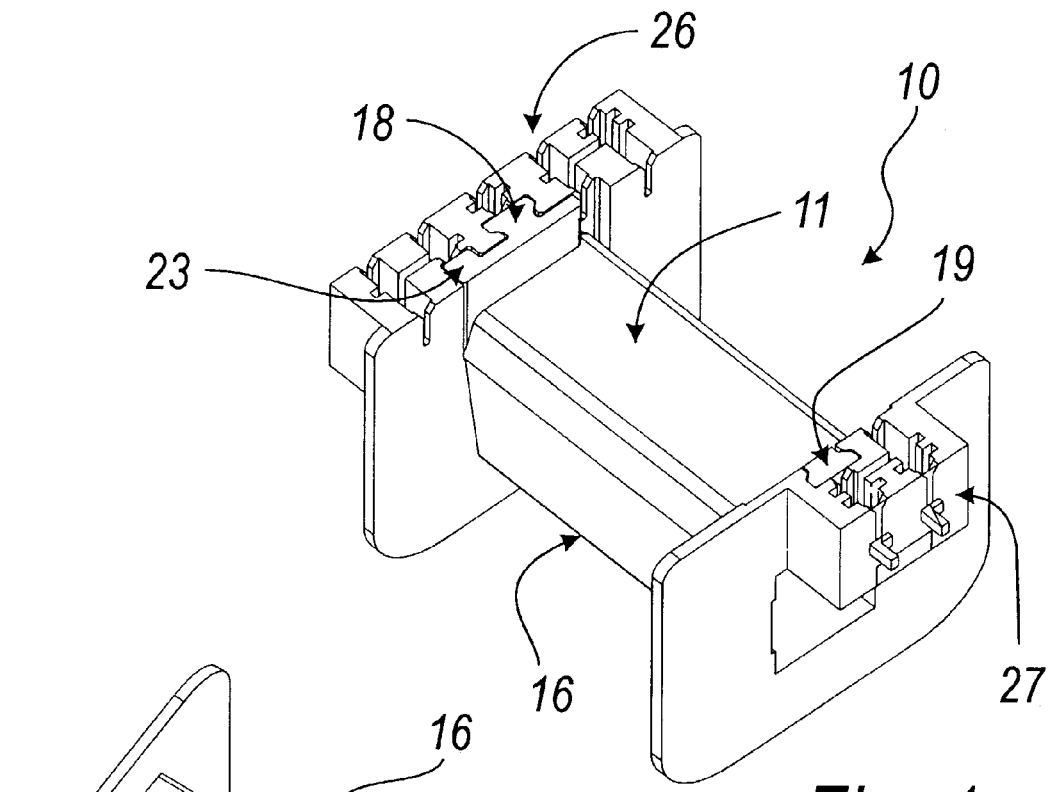
FIG. 1 is a perspective view of a device for connecting and insulating a thermal protector and/or a fuse having the structure according to the invention.

With reference to the figures, a device for connecting and insulating a thermal protector and/or a fuse for electrical winding of motors having the structure according to the invention is generally designated by the reference numeral 10.

The device 10 comprises a rigid tray-like shell 11 made of plastics, which substantially has a rectangular shape, for example for a thermal protector 12 (a component that is sensitive to temperature variations), which in this case has two terminals 17, described in greater detail hereinafter, for electrical contact with the power supply of an electric motor, not shown, as specified more clearly hereinafter, which protrude from the shell 11.

The shell 11 is complementarily to a spool 16 of the winding 14 of the motor, whose structure it completes and to which it is coupled before the winding operation. In other words, the shell 11 has a shape that complements the shape of the spool 16 so that, together, they form a whole structure.

For this reason, the shell 11 has two mutually opposite male interlocking components, designated by the reference numerals 18 and 19 respectively, which are complementary to corresponding female interlocking components, designated by the reference numerals 20 and 21 respectively, of the spool 16.

In particular, the male components 18 and 19 lie at right angles to the plane of arrangement of the thermal protector 12 and have a dovetail profile that is shaped complementarily to the respective female components 21 and 22.

An additional tab-shaped element 23 having a quadrangular profile is parallel to the component 18 and laterally adjacent thereto in order to enter a complementarily shaped seat 33 of the spool 16.

Figure 2:
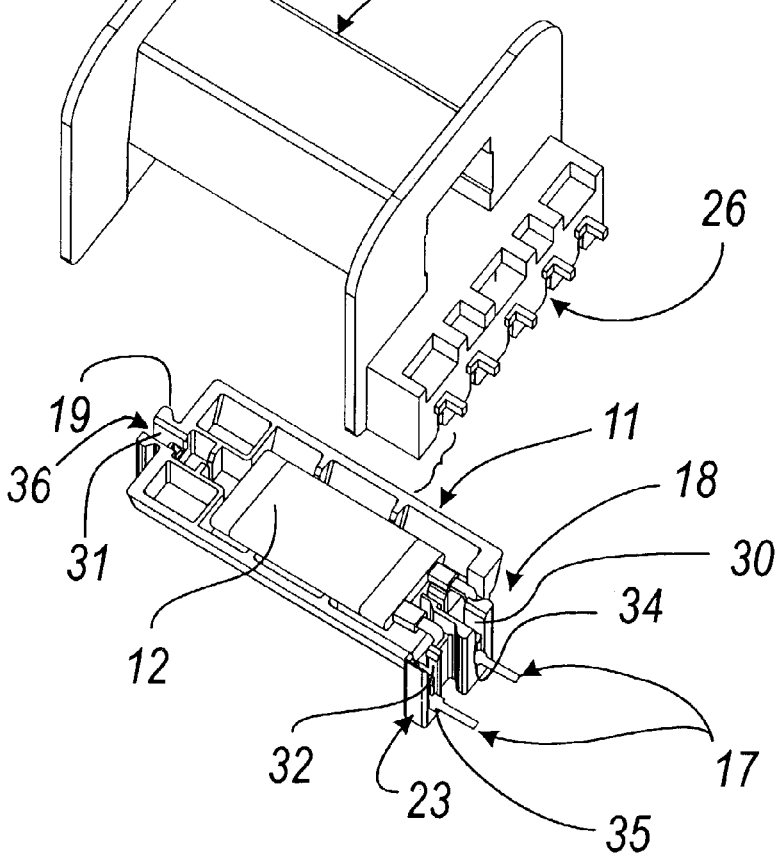
FIG. 2 is a first exploded view of the elements of FIG. 1.
Figure 3:
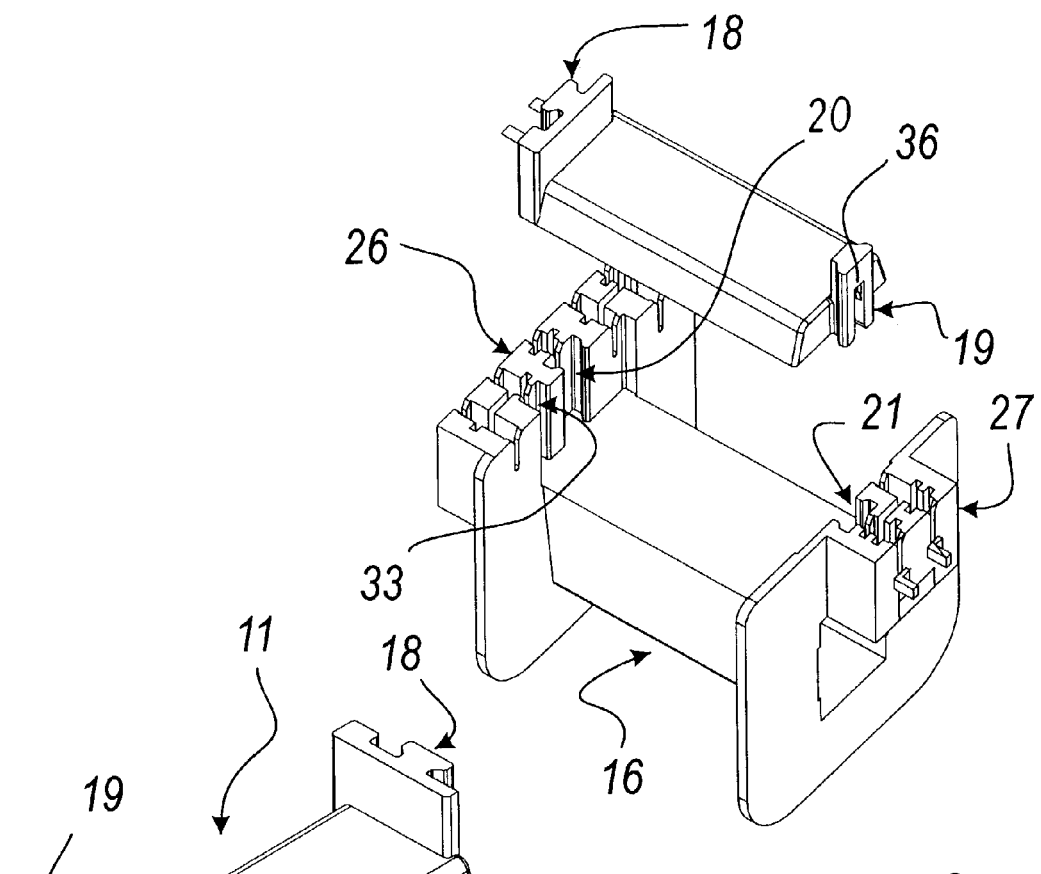
FIG. 3 is a second exploded view of the elements of FIG. 1.
Figure 4:
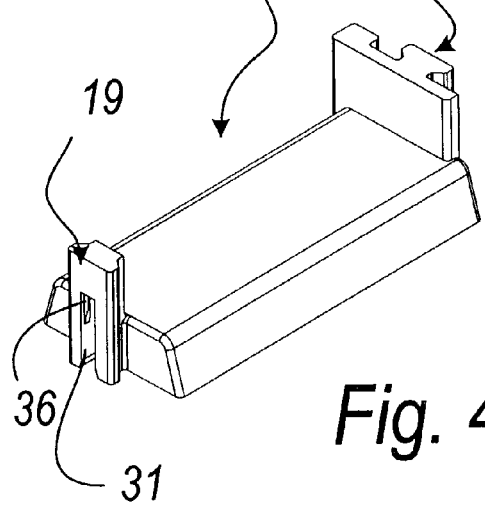
FIG. 4 is a perspective view of a shell comprised within the device according to the invention.
Figure 5:
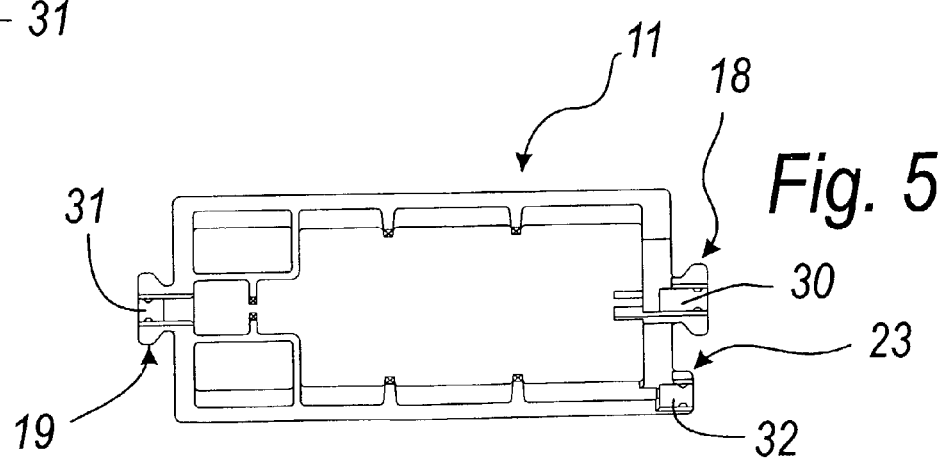
FIG. 5 is a plan view of the shell of FIG. 4.
Figure 6:
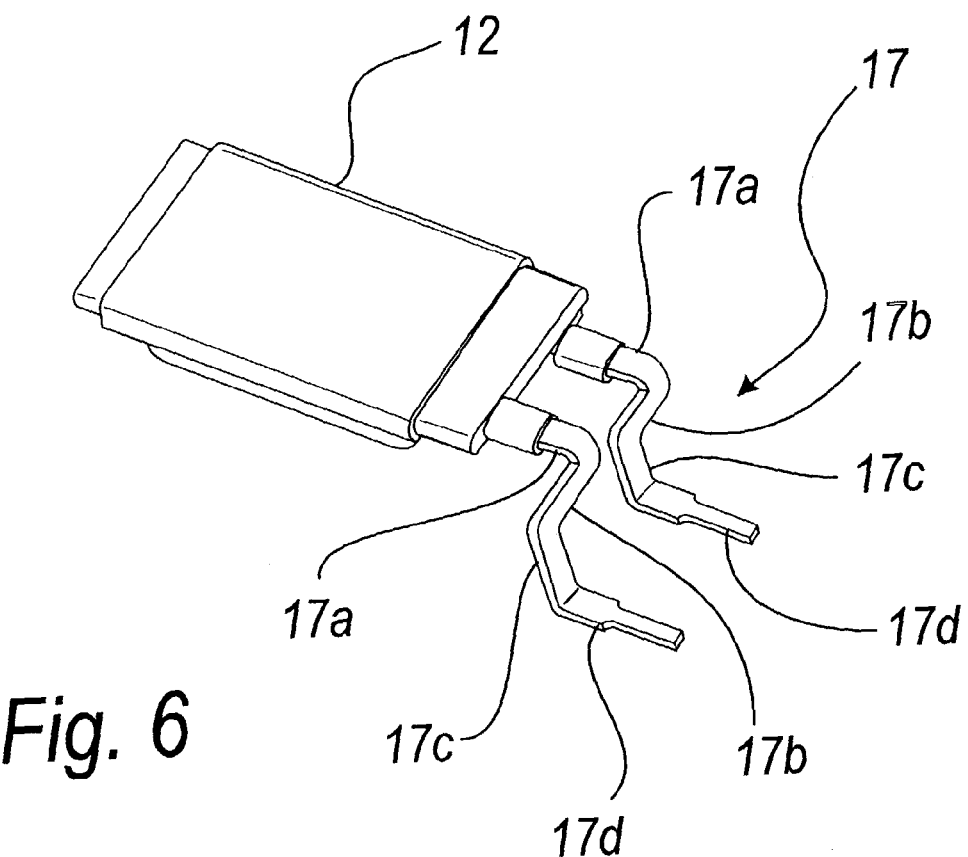
FIG. 6 is a perspective view of a thermal protector with its terminals.
Figure 7:
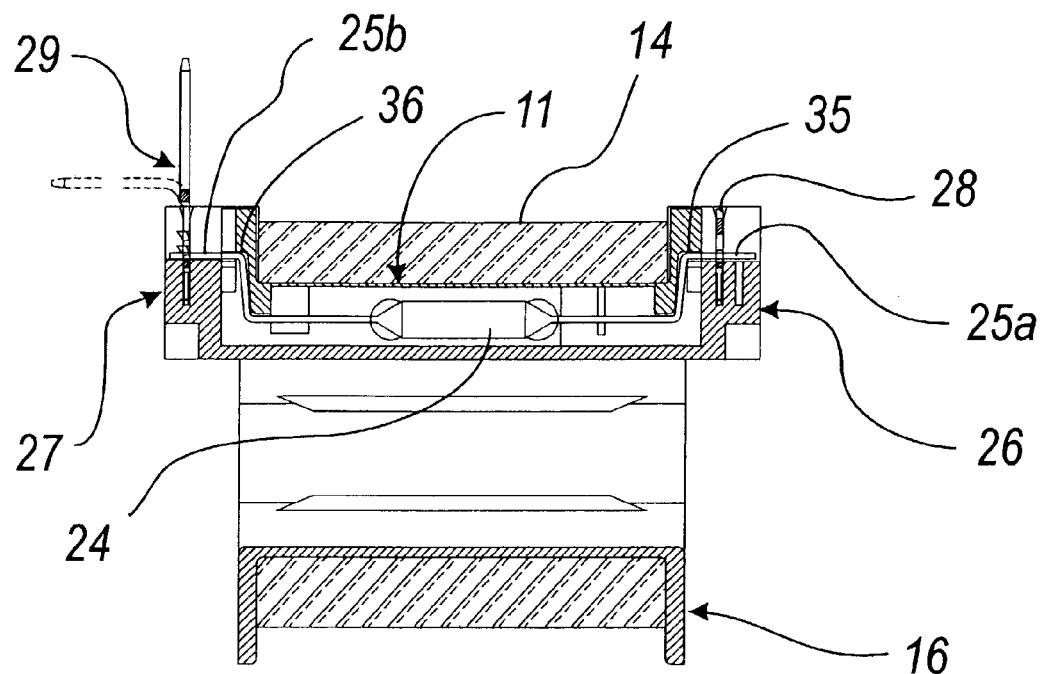
FIGS. 7 and 8 are sectional views of the device according to the invention with a fuse and with a thermal protector, respectively.
Figure 8:
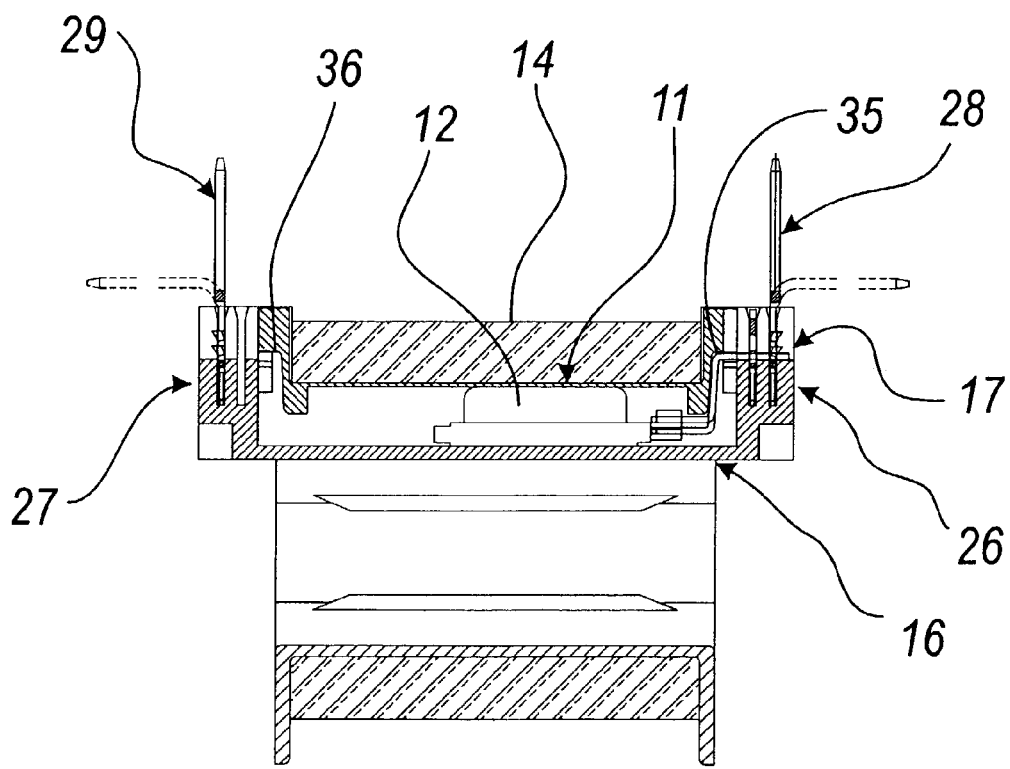

The male components 18, 19 and the element 23 have respective passages 30, 31 and 32 that can be crossed by electrical terminals, which in the case of FIGS. 2 and 7 are constituted by the terminals 17 that pass through the component 18 and through the element 23.

In the alternative case of FIG. 7, which provides for example for the presence of a fuse 24, there are mutually opposite terminals 25a and 25b that respectively pass through the components 18 and 19.

The shell is conveniently arranged adjacent to the position of the windings 14, so that the thermal protector 12 is adjacent thereto and can sense the temperature.

In this embodiment, the electrical contact terminals 17 are constituted by a corresponding number of metallic laminas obtained by blanking and shaping, which protrude from the shell 11 and are partially accommodated in, and rested on, the passages 30, 31 and 32 of the components 18 and 19 and of the element 23.

Each lamina 17 for the protector 12 has a first portion 17a that is parallel to the protector 12, a second portion 17b that is perpendicular but lies on the same plane, a third portion 17c that is perpendicular to the preceding one (to be inserted in the corresponding passage 30 or 31), and a fourth portion 17d that is parallel to the first one.

The spool 16, also made of plastics, is conveniently provided with mutually opposite connectors 26 and 27, which accommodate winding connection electrical terminals 28 and 29 for connection to the winding 14 and to the protector 12 and/or to the fuse 24.

Contact of the connectors 26, 27 with the laminas 17, which rest on end portions 34, 35 and 36 of the respective passages 30, 31 and 32, occurs by mutual interlocking upon mutually joining the shell 11 and the spool 16.

In practice it has been found that the present invention has achieved the intended aim and objects.

It should in fact be noted that despite the constructive simplicity of the structure of the device according to the invention, a high degree of standardization for a plurality of motors has been achieved, and automated assembly has been ensured, without however renouncing the assurances of safety and quality of the final product.

The assembly of the protector and/or of the fuse is substantially guided and practically free from possibilities of assembly errors.

Moreover, it should be noted that the particular structure of the protector allows to place it in an optimum situation in order to detect effectively the temperature changes of the winding.

It should also be noted that the structure of the shell of the thermal protector allows to eliminate welded connections.

The present invention is susceptible of numerous modifications and variations, all of which are within the scope of the appended claims.

The technical details may be replaced with other technically equivalent elements.

The materials and the dimensions may be any according to requirements.

The disclosures in Italian Patent Application No. PD2002A000094 from which this application claims priority are incorporated herein by reference.

What is claimed is:

1. A device for insulation of a thermal protector and of a fuse and for connection thereof to a spool of an electrical winding of a motor, comprising:
   a tray-like shell made of plastics, which contains the protector and the fuse;
   at least one electrical contact terminal provided at said thermal protector and fuse that protrude from said shell, said shell having a shape that complements shape of the spool so as to form therewith a whole structure; and
   respective male and female complementary interlocking components, provided at the shell and spool, respectively, to provide interlocking of said shell and spool; said shell having two mutually opposite male interlocking components, which are shaped complementary to corresponding female interlocking components provided at the spool.

2. The device of claim 1, wherein said shell comprises a plane of arrangement for said thermal protector and fuse, said male components being provided so as to lie at right angles to the plane of arrangement of the thermal protector and fuse.

3. The device of claim 2, wherein said male components have a dovetail profile that is shaped complementarily to the corresponding female components.

4. The device of claim 2, wherein said shell further comprises an additional tab-shaped element having a quadrangular profile, and being provided parallel and laterally adjacent to one of said male components in order to enter a complementarily shaped seat of the spool.

5. The device of claim 4, wherein said male components and said tab-shaped element are provided with respective passages that are crossed by said at least one electrical contact terminal.

6. The device of claim 5, comprising a plurality of electrical terminals constituted by metallic laminas obtained by blanking and shaping.

7. The device of claim 6, wherein each one of said electrical terminals for said thermal protector is constituted by a lamina provided with a first portion that is parallel to said thermal protector, a second portion that is perpendicular thereto, a third portion that is perpendicular to the second portion and is adapted to be inserted in a corresponding one of said passages, and a fourth portion that is parallel to the first portion.

8. The device of claim 6, wherein said metallic laminas protrude from said shell and are partially accommodated in, and rested on, said passages of said male components and of said tab-shaped element.

9. The device of claim 1, wherein said spool is provided with connectors arranged at opposite ends thereof and with winding connection electrical terminals, accommodated in said opposite connectors, for connection to said winding and to said thermal protector and fuse.

10. The device of claim 9, wherein said passages comprise respective end portions on which said laminas are rested for contact with said winding connection terminals upon coupling of said shell and said spool.

* * * * *